Figure 1:
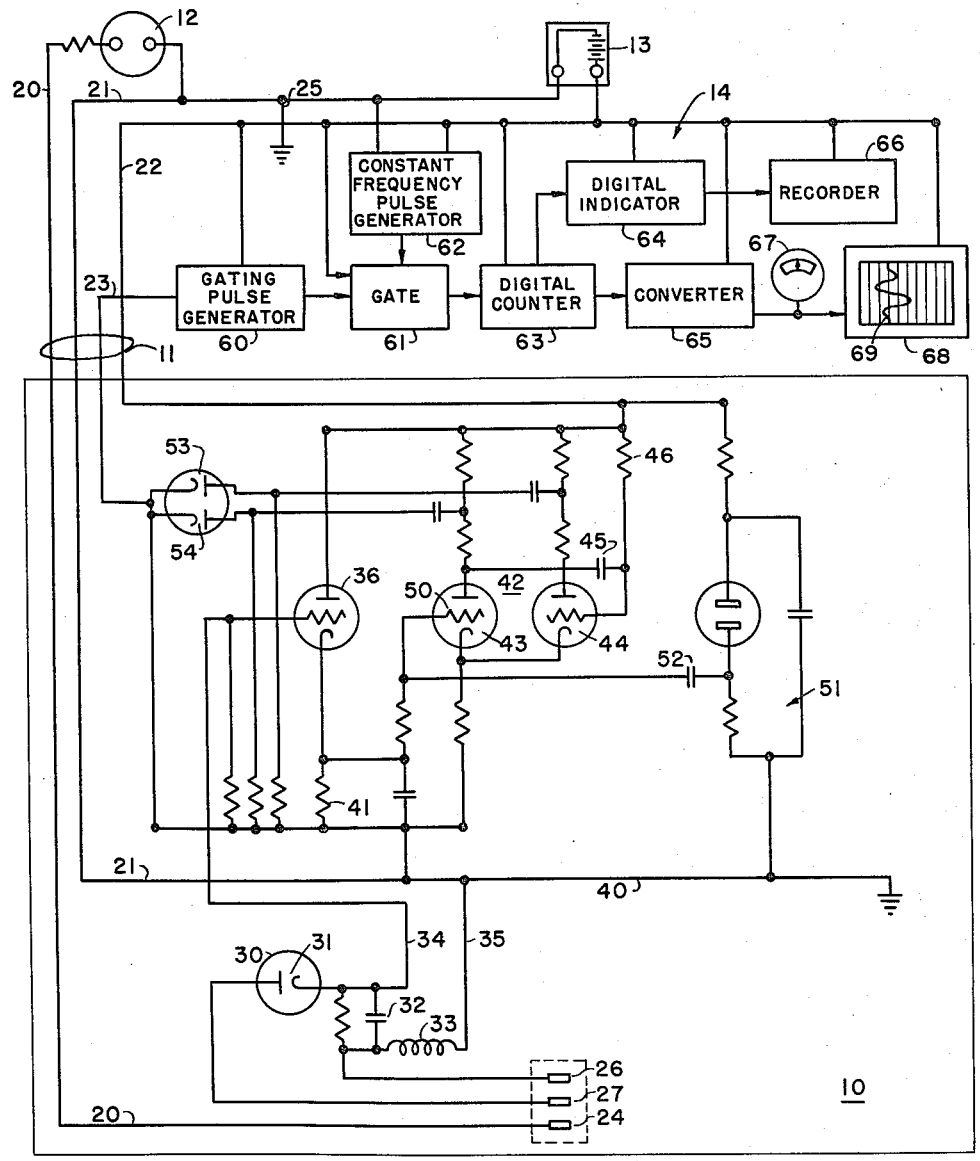

Dec. 31, 1963            C. B. VOGEL            3,116,448
ELECTRICAL WELL LOGGING APPARATUS HAVING SURFACE DIGITAL
RECORDING MEANS AND A MULTIVIBRATOR INCLUDED
WITHIN A DOWNHOLE INSTRUMENT
Filed Aug. 26, 1959

INVENTOR:
   CHARLES B. VOGEL

BY:
   HIS ATTORNEY

United States Patent Office 3,116,448
Patented Dec. 31, 1963

3,116,448
ELECTRICAL WELL LOGGING APPARATUS HAVING SURFACE DIGITAL RECORDING MEANS AND A MULTIVIBRATOR INCLUDED WITHIN A DOWNHOLE INSTRUMENT
Charles B. Vogel, Houston, Tex., assignor to Shell Oil Company, a corporation of Delaware
Filed Aug. 26, 1959, Ser. No. 836,186
6 Claims. (Cl. 324—1)

This invention pertains to logging devices and more particularly to a resistivity type of logging device which incorporates a very accurate recording system.

In a resistivity type logging device spaced electrodes are lowered into a borehole and an electric current introduced into the earth formation surrounding the borehole between one of the electrodes and a ground electrode positioned at the surface of the borehole. A voltage signal which is of course proportional to the resistivity of the formation is detected between two additional electrodes which are spaced from the first electrode. This voltage signal is then transmitted to the surface where its magnitude is recorded on suitable devices. While such recording systems have been used in the past their accuracy is impaired by the attenuation of the signal as it is transmitted over the logging cable. Various devices have been proposed in the past for overcoming these deficiencies such as the use of downhole amplifiers or recording units. None of these devices are entirely satisfactory since they all have various drawbacks.

In addition to the above difficulties it has been the practice in the past in electrical logging devices to utilize a monotonically increasing voltage in the surface recording instruments to display the magnitude of the voltage measured by the downhole electrodes. Thus, when the monotonically increasing voltage equals the signal voltage the recording means is triggered to record. It is difficult to obtain a stabilized monotonically increasing voltage due to drift of various electronic components in addition to the aging of the tubes used in the various components. Accordingly, recording systems using monotonically increasing voltages provide inaccurate information unless they are continuously checked and adjusted.

Accordingly, it is the principal object of this invention to provide a resistivity type of logging device with an accurate recording system.

A further object of this invention is to provide a resistivity type of logging device with an accurate recording system which utilizes a digital counter for determining a time interval which is proportional to the resistivity of the earth formation surrounding the borehole.

A still further object of this invention is to provide a resistivity type of logging device with a simple downhole circuit which will convert the voltage measured by the spaced electrodes into a time interval whose length is proportional to the voltage signal.

The above objects and advantages of this invention are obtained by utilizing the voltage signal measured by the spaced electrodes to control the time constant of a monostable multi-vibrator circuit. Thus, the time constant of the multi-vibrator circuit will be proportional to the voltage signal and the pulses which appear at the output of the two stages of the multi-vibrator will indicate the beginning and end of a time interval which is proportional to the voltage signal. This time interval is used to control a gate circuit which controls the flow of pulses from a constant frequency source to a digital counter. The digital counter will accurately measure the time interval and its final reading may be either recorded directly or converted to an electrical analog which may be recorded on a chart recorder or the like.

From the above description it can be seen that only two sharp pulses are transmitted over the well logging cable instead of the usual voltage signal. Thus, any attenuation of the signals will have little effect on the accuracy of the recording device since the time interval between the signals is the quantity being measured and not the actual amplitude of the signals. This eliminates the major source of inaccuracy in previous resistivity logs in which the surface recording equipment was designed to measure the amplitude of the voltage signal. The amplitude of the voltage signal is of course seriously attenuated as it travels over a long length of logging cable. The downhole instrument of this invention accurately converts this voltage signal to a time interval through the use of relatively simple and reliable circuits. Thus, the accuracy of the original measurement is carefully preserved and recorded by the surface equipment.

Figure 2:
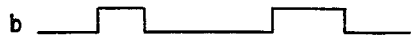
Figure 2:
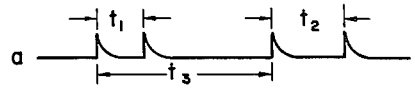

This invention will be more easily understood from the following detailed description of a preferred embodiment when taken in conjunction with the attached drawings in which:

FIGURE 1 is a schematic diagram of a portion of a circuit and a block diagram of the remainder of the circuit construction according to this invention; and FIGURE 2 illustrates the shape and time displacement of the various voltage signals in the circuit shown in FIGURE 1.

Referring now to FIGURE 1 there is shown a resistivity logging device in which the portion of the diagram enclosed within the solid line 10 is disposed in the downhole instrument. No particular construction for the downhole instrument is shown since suitable constructions are well known to those skilled in the art. The downhole instrument is connected to the surface equipment over a four-conductor logging cable 11 in order that suitable power may be supplied to the downhole instrument and signals from the downhole instrument transmitted to the surface. The surface equipment consists of a suitable alternating current power supply 12 and a direct current power supply 13 and the digital recording system 14 which will be more fully described below. The alternating current power supply 12 is coupled to one conductor 20 and a ground conductor 21 while the direct current power supply is coupled to a conductor 22 and the ground conductor 21. The signals from the downhole instrument are transmitted to the surface over the fourth conductor 23. The conductor 20 is coupled to an electrode 24 located in the downhole instrument. Thus, an electrical current will flow between the electrode 24 and the ground 25 located at the surface. Two additional electrodes 26 and 27 are spaced from the electrode 24 and positioned to measure a voltage signal in the earth formation which is of course proportional to the resistivity of the earth formation.

The voltage signal from the two electrodes 26 and 27 is passed through a half-wave rectifying circuit 30 which utilizes a single diode 31 in combination with a filtering circuit consisting of a capacitor 32 and an inductance 33. The rectifying circuit 30 of course rectifies the alternating current voltage signal from the electrodes 26 and 27 and supplies it as a direct current voltage to the lead 34 and grounded lead 35. The lead 34 is coupled to the grid of a cathode follower type amplifier 36 whose plate is connected to the lead 22 and cathode is connected to the ground lead 40 through suitable resistance 41. The signal of the cathode follower circuit 36 will of course have the same polarity as the input signal to the grid but will appear across an impedance of reduced and nearly constant value, since it is characteristic of cathode followers to reduce impedance without amplification. The monostable or delay multi-vibrator 42 utilizes two triode tubes 43 and 44 with the tube 44 normally conducting while tube 43 is normally non-conducting. The plates of both triodes 43 and 44 are connected to the lead 22 through suitable resistances while the output signal from the tube 43 coupled to the grid of the tube 44 through a capacitor 45. The grid of the tube 44 is coupled to the lead 22 through a suitable resistance 46. The cathodes of both tubes are connected together and to the ground through a suitable resistance.

In the above mono-stable multi-vibrator circuit the time constant of the circuit is determined by the capacitor 45 and resistance 46 in combination with the signal supplied to the grid of the tube 43. The output signal from the cathode follower stage 36 is coupled to the grid 50 of the tube 43 in order that the time constant of the multi-vibrator will be made proportional to the signal from the cathode follower stage. The grid 50 is also coupled to a free-running oscillator 51 through a capacitor 52 with the free-running oscillator 51 having a frequency for example of 10 cycles per second. This pulse is used to trigger the non-conducting stage 43 of the multi-vibrator. The signal from the two stages of the multi-vibrator are coupled to diodes 53 and 54, respectively, which insures that only the positive going pulses from the multi-vibrator will be transmitted to the surface recording equipment.

When the above-described multi-vibrator circuit is operated it will supply two positive going pulses to the lead 23 which are separated by a time interval proportional to the voltage signal measured by the electrodes 26 and 27. This can be readily seen when it is appreciated that the output signal of the cathode follower 36 has the same polarity as the signal supplied by the rectifying stage 30, the rectified signal of course being proportional to the voltage signal measured by the electrodes 26 and 27. The mono-stable multi-vibrator 42 is designed so that the tube 44 is normally conducting while the tube 43 is normally non-conducting. The tube 43 may be made conducting by a relatively short pulse of sufficient magnitude, this pulse being supplied periodically by the free-running oscillator 51. Of course, when the tube 43 becomes conducting the tube 44 becomes non-conducting and the tube 43 will continue to conduct until the capacitor 45 is fully charged. The charging time for the capacitor 45 will be determined by the size of the capacitor, the size of the resistance 46 and the magnitude of the voltage signal applied to the grid 50 by the cathode follower stage 36. Since the size of the capacitor 45 and the resistance 46 is fixed this means that the tube 43 will conduct for a time interval proportional to the voltage signal. As explained above, this voltage signal is proportional to the voltage signal measured by the electrodes 26 and 27. When the tube 43 becomes conducting and the tube 44 becomes non-conducting a pulse will appear on the plate of the tube 44 which will be transmitted to the surface through the diode 53 over the conductor 23. As explained above, the diodes 53 and 54 insure that only the positive pulse will be transmitted to the surface. As shown in FIGURE 2(a), the pulses transmitted over the conductor 23 have a uniform amplitude and relatively steep wave front with a slow decay. The two pulses on the left are separated by a time interval $t_1$ which indicates a relatively low magnitude voltage and thus low resistance between the electrodes 26 and 27 while the pulses to the right are separated by a time interval $t_2$ which indicates a larger voltage signal and thus a larger resistance between the electrodes. The pulses of each pair are separated by the time interval $t_3$ which is of course determined by the pulse rate of the free-running oscillator. This means that ten readings of the resistance of the earth surrounding the borehole will be taken each second. Accordingly, the speed at which the downhole instrument is moved through the borehole can be governed to give sufficient readings for the information desired.

The pulses transmitted over the conductor 23 are supplied to a gating pulse generator 60 which converts the pairs of sharp pulses from the downhole instrument into square wave pulses having relatively short lengths. These pulses are shown in FIGURE 2b and have a length equal to the time intervals $t_1$ and $t_2$, respectively. The square wave pulses are transmitted to a gate circuit 61 which is disposed to control the application of the pulses from a constant frequency pulse generator to a digital counter 63. The constant frequency pulse generator may have any desired frequency providing it is high enough to accurately measure the time intervals $t_1$ and $t_2$, a suitable frequency being 10 kilocycles. The digital counter 63 counts the individual pulses from the pulse generator 62 during the time intervals $t_1$ and $t_2$. The output from the digital counter is supplied to a digital indicator 64 and a converting unit 65. The digital indicator 64 merely indicates the total count on the counter accumulated for each individual time interval while the converter 65 converts the individual count from the digital counter 63 to an electrical analog such as a voltage, a resistance or a combination of resistance elements. The output from the digital indicator may be recorded digitally on punched tape or magnetic tape, for example, or by an adding machine type printer 66 if a permanent record is desired. The output from the converting unit 65 is first measured on a measuring instrument 67 which may be a voltmeter or ammeter depending on the particular form of the signal from the converting unit 65. The signal from the converting unit 65 is also transmitted to a chart recording instrument 68 which records a continuous graph 69 whose displacement along the X axis indicates the magnitude of the electrical signal detected by the spaced electrodes 26 and 27 and whose displacement along the Y axis indicates the particular location in the borehole at which the signal was measured. It is of course necessary to synchronize the movement of the chart record and the recording means 68 with the movement of the downhole instrument through the borehole. Suitable selsyn units for accomplishing this result are well known in the prior art. The digital counting and visual recording system briefly described above is more particularly described and claimed in the applicant's copending application Serial No. 836,303, filed August 26, 1959, and forms no part of this invention.

From the above description it can be appreciated that the time intervals $t_1$ and $t_2$ determined by downhole instrument 10 are accurately measured by the digital counting and recording system described above. The gating circuits 60 and 61 are very accurate devices which can be made to respond to a positive going signal of a predetermined amplitude and thus will accurately trigger the digital counter 63 at the same point on each pulse supplied by the downhole instrument. Since the digital counter 63 is counting pulses having a rate of $10^4$ this means that the system will measure the time interval with an accuracy of .0001 second. As was previously explained above, the voltage signal detected by the spaced electrodes 26 and 27 is accurately converted to the time intervals $t_1$ and $t_2$ by the downhole instrument. Thus, the recording system of this invention measures a quantity which is proportional to the amplitude of the voltage signal with greater accuracy than possible with prior art devices. This result is achieved by first converting the voltage to a time interval and then measuring this time interval through the use of a digital counter and a fixed frequency pulse source.

While but a single embodiment of this invention has been described, modifications and changes can be made by those skilled in the art. For example, while but two spaced electrodes 26 and 27 are shown for measuring a voltage signal a single, or more than two electrodes may at times be desirable. Also the method of this invention may be used to transmit and record forms of logging information other than that involved in resistivity logging. For example, self potential logging information may be so transmitted and recorded. Specifically, it is clear that the use of digital recording as taught herein may be applied to the practice of various forms of logging and that the use of punched tape records and other forms of digital records will in many cases provide important advantages in the practice of all types of well logging. Accordingly, this invention should not be limited to the specific details described hereinabove but only to its broad spirit and scope.

I claim as my invention:

1. A well logging system in which the resistivity of the earth surrounding a borehole is measured comprising: a downhole logging tool adapted to be lowered into a borehole at the end of a cable, a plurality of spaced electrodes being mounted in said downhole tool to introduce an electrical current flow in the earth and detect a voltage induced by said current flow at a point spaced from the point at which said current is introduced; a delay multi-vibrator, said electrode means being coupled to said delay multi-vibrator to permit said detected voltage to control the period of the delay multi-vibrator to produce two pulses, the time interval between the pulses being proportional to said detected voltage; said multi-vibrator being coupled to said cable to transmit said pulses to the surface of the wellbore over said cable; a digital counter having gating circuits, said pulses being utilized at the surface to control the gating circuits of said digital counter; a fixed frequency source for producing a train of constant frequency pulses, said fixed frequency source being coupled to said digital counter to permit said digital counter to count the pulses from said fixed frequency source during the time interval between said pulses and means coupled to said digital counter for visually recording the count of said digital counter in the form of a continuous trace.

2. A well logging system in which a characteristic of the formation surrounding a borehole is determined in the form of an electrical signal comprising: a downhole logging tool adapted to be lowered into a borehole at the end of a cable, detecting means disposed in said downhole tool to detect a characteristic of the formation surrounding the borehole and convert said detected characteristic to an electrical signal; a delay multi-vibrator disposed in said downhole tool, circuit means for coupling said detecting means coupled to said multi-vibrator to permit said electrical signal to control the period of said multi-vibrator; said multi-vibrator producing a pulse at the beginning and end of its period; said multi-vibrator being coupled to said cable to transmit said pulses to the surface; a digital counter and gate circuit disposed at the surface, a source of fixed frequency pulses coupled to said gate means; said cable being coupled to the gate means to permit said pulses to control opening and closing of said gate means to apply said fixed frequency pulses to said digital counter during the time interval between said downhole pulses and means coupled to said digital counter for displaying the total counts of said digital counter in the form of a continuous graph.

3. A well logging system in which the resistivity of the earth surrounding a borehole is measured comprising: a downhole instrument disposed to be lowered into the borehole on the end of a cable, said downhole instrument including electrode means disposed to provide an electrical signal proportional to the resistivity of the earth surrounding the borehole; circuit means for coupling said electrical signal to an amplifier, a delay multi-vibrator having two halves the output side of said amplifier being coupled to one half of said delay multi-vibrator to control the period of said multi-vibrator; said multi-vibrator being coupled to said cable to transmit to the surface; the output signals from both halves of said multi-vibrator; a digital counter, a source of fixed frequency pulses coupled to said digital counter through a gate means, said cable being coupled to said gate means, said gate means being controlled by the signals from said multi-vibrator and means coupled to said digital counter to record in the form of a continuous chart record the count recorded on said digital counter.

4. A resistivity logging device comprising: a downhole instrument disposed to be lowered into a wellbore on a cable; a plurality of spaced electrodes mounted in said instrument, said spaced electrodes being disposed to induce an electrical current flow in the earth surrounding said borehole and detect a voltage proportional to the resistivity of the earth; a mono-stable multi-vibrator disposed in said instrument and having a normally conducting stage and a normally non-conducting stage; a source of constant frequency pulses coupled to the control element of said normally non-conducting stage to trigger said non-conducting stage to conduct, circuit means for coupling said spaced electrodes to the control element of said normally non-conducting stage to control the period of conduction of said non-conducting stage in relation to the amplitude of said detected voltage; circuit means coupled to both stages of said multi-vibrator for transmitting the output pulses of said multi-vibrator to the surface and means coupled to said circuit means for determining and recording the time interval between the pulses from said multi-vibrator.

5. A system for electrical well logging, including a downhole tool adapted to be moved through a borehole on an electrically conductive cable and surface-located measurement and indicating means adapted to receive electrical signals transmitted over the cable, said system comprising: means in the downhole tool adapted to receive a voltage corresponding to an electromotive force in the earth formation surrounding the borehole; a delay multi-vibrator coupled to said means to receive said voltage as a delay-period-control, so that the multi-vibrator produces pairs of pulses in which the time interval between the pulses of a pair is proportional to said voltage; circuits coupled to said multi-vibrator and said cable to apply said pairs of pulses to the cable for transmission to the surface; a source of fixed frequency pulses located at the surface, a digital counter and counter gate, said source of fixed frequency pulses being coupled through said counter gate to said digital counter; gate-actuating circuit means coupled to said cable to receive said pairs of pulses and actuate said counter gate to apply the fixed frequency pulses to the counter during the time interval between the successive pulses of a pair, so the counter counts the number of fixed frequency pulses occurring during said interval.

6. A system for electrical well logging, including a downhole tool adapted to be moved through a borehole on an electrically conductive cable and surface-located measurement and indicating means adapted to receive electrical signals transmitted over the cable, said system comprising:

measuring means in the downhole tool disposed to detect a characteristic of a formation surrounding the borehole and supply an electrical signal related thereto;

a delay multi-vibrator coupled to receive said electrical signal, said electrical signal controlling the period of said delay multi-vibrator to produce a pair of pulses in which the time interval between the pulses of a pair is proportional to the amplitude of the electrical signal;

said delay multi-vibrator being coupled to said cable to transmit said pulses to the surface;

a source of fixed frequency signal pulses located at the surface, a digital counter having a counter gate means, said source of fixed frequency pulses being coupled through said counter gate means to said digital counter; a gate-actuating circuit means coupled to said cable and said counter gate means to receive said pairs of pulses and actuate said counter gate means to apply the fixed frequency pulses to the counter during the time interval between the successive pulses of a pair, so that the counter counts the number of fixed frequency pulses occurring during said interval.

References Cited in the file of this patent

UNITED STATES PATENTS

| | | |
|---|---|---|
| 2,317,259 | Doll | Apr. 20, 1943 |
| 2,568,241 | Martin | Sept. 18, 1951 |
| 2,639,858 | Hayes | May 26, 1953 |
| 2,840,806 | Bateman | June 24, 1958 |
| 2,897,486 | Alexander et al. | July 28, 1959 |
| 2,917,728 | Grossman | Dec. 15, 1959 |
| 2,963,682 | Saseen | Dec. 6, 1960 |
| 3,007,134 | Kolb | Oct. 31, 1961 |
| 3,079,549 | Martin | Feb. 26, 1963 |

OTHER REFERENCES

Radio Engineering, by Terman, Third Edition, Mc-Graw-Hill, New York, 1947, pages 586–590.

Criteria for the Selection of Analog-to-Digital Converters, by Gerhard L. Hollander, Proceedings of the National Electronics Conference for 1953, pages 670–683, Feb. 15, 1954.